United States Patent [19]

Wakatsuki et al.

[11] 4,442,923
[45] Apr. 17, 1984

[54] AUTOMATIC REGULATOR FOR INTERNALLY EXPANDING DRUM BRAKE

[75] Inventors: Goroei Wakatsuki, Fujimi; Sadashi Yamamoto, Wako, both of Japan

[73] Assignee: Honda Giken Kogyo Kabushiki Kaisha, Tokyo, Japan

[21] Appl. No.: 283,618

[22] Filed: Jul. 15, 1981

[30] Foreign Application Priority Data

Jul. 18, 1980 [JP] Japan .................................. 55-98316
Jul. 18, 1980 [JP] Japan .................................. 55-98315

[51] Int. Cl.³ ............................................. F16D 65/56
[52] U.S. Cl. ........................ 188/79.5 K; 74/501.5 R; 188/2 D; 188/24.19; 188/196 BA; 192/111 A
[58] Field of Search .................. 188/79.5 K, 79.5 GE, 188/79.5 S, 2 D, 196 B, 196 BA, 202, 24.19; 192/111 A; 74/501.5 R

[56] References Cited

U.S. PATENT DOCUMENTS

| | | | |
|---|---|---|---|
| 1,950,381 | 3/1934 | Bartz | 188/196 B |
| 2,096,396 | 10/1937 | Gates | 188/196 B X |
| 2,296,026 | 9/1942 | Freeman | 188/79.5 K |
| 2,926,758 | 3/1960 | Frola | 188/196 B X |
| 3,157,062 | 11/1964 | Howard | 74/501.5 |
| 3,216,534 | 11/1965 | Chouings et al. | 188/196 BA X |
| 3,941,215 | 3/1976 | Schoch | 188/2 D X |
| 4,222,467 | 9/1980 | Kluger et al. | 188/196 BA X |
| 4,260,049 | 4/1981 | Fasano | 192/111 A |
| 4,274,300 | 6/1981 | Golobay | 74/501.5 R |

FOREIGN PATENT DOCUMENTS 52-61023 5/1977 Japan .......................... 188/196 BA

*Primary Examiner*—George E. A. Halvosa
*Attorney, Agent, or Firm*—Posnack, Roberts, Cohen & Spiecens

[57] ABSTRACT

An automatic regulator for an internally expanding drum brake capable of automatically controlling the amount of play or ineffective stroke of a brake wire to a predetermined value so that an intended braking effect can be always produced with a definite stroke of the brake wire irrespective of wear on the linings of brake shoes or permanent expansion of the brake wire. A brake lever is operatively connected with the brake shoes housed in a brake drum so that the brake lever is pivoted by operation of the brake wire to outwardly expand the brake shoes to place the shoe linings into frictional engagement with a brake surface of the brake drum. The return angle of the brake lever upon a brake releasing operation is rendered constant by a stopper mechanism. The brake wire comprises an inner wire member connected to the brake lever, and an outer wire member slidably fitted over the inner member and urged by a compression spring in a direction away from the brake lever. The outer wire member is moved relative to the inner wire member to take up slack therebetween due to increased wear on the shoe linings or permanent expansion of the brake wire in response to a brake applying or releasing operation.

7 Claims, 10 Drawing Figures

4,442,923

AUTOMATIC REGULATOR FOR INTERNALLY EXPANDING DRUM BRAKE

BACKGROUND OF THE INVENTION

1. Field of the Invention

This invention relates to an automatic regulator for an internally expanding drum brake, which is applied to vehicles such as motorcycles.

2. Description of the Prior Art

In the internally expanding drum brakes, linings on brake shows are repeatedly placed into frictional engagement with a brake surface of a brake drum so that the shoe linings are gradually worn out to increase a clearance between the shoe linings and the brake surface of the brake drum to cause a permanent expansion of a brake wire. As a result, an amount of play or ineffective stroke of the brake wire during braking operations is increased to change the operator's feel in braking and to reduce the braking effect.

SUMMARY OF THE INVENTION

In view of the above, an object of the invention is to provide an automatic regulator for an internally expanding drum brake which is capable of automatically correcting an increased amount of play or ineffective braking stroke of a brake wire when such play exceeds a predermined level so that an operator can always obtain the intended braking effect with a constant braking input on the brake wire.

According to the present invention, there is provided an automatic regulator for an internally expanding drum brake which comprises in combination: a brake drum rotating with a rotary shaft and having a braking surface; a stationary brake panel; a pair of brake shoes housed in the brake drum and mounted on the stationary brake panel for outwardly expanding movement; a brake cam rotatably interposed between opposed free ends of the first and second brake shoes and being rotatable to outwardly expand the first and second brake shoes toward the brake surface of the brake drum for frictional engagement therewith; a brake lever secured to the brake cam; a brake wire means connected to the brake lever; a return spring for urging the brake shoes in a contracting direction; a stopper mechanism for controlling a return angle of the brake lever to be constant upon a brake releasing operation; and a regulating means for automatically regulating the amount of play of the brake wire to a constant level in response to brake applying or releasing operations.

The above and other objects, features and advantages of the invention will become apparent from the following detailed description of the invention when taken in conjunction with the accompanying drawings which illustrate a few preferred embodiments of the invention.

BRIEF DESCRIPTION OF THE DRAWINGS

FIGS. 1 through 5 show a first embodiment of the invention, wherein:

FIG. 1 is a side elevational view partially in section;

FIG. 2 is a sectional view taken along line II—II in FIG. 1;

FIG. 3 is a sectional view taken along line III—III in FIG. 2;

FIG. 4 is a sectional view taken along line IV—IV in FIG. 1: and

FIG. 5 is a side elevational view partially in section of an essential portion of FIG. 1, showing the state of a brake wire in which the amount of play thereof during the braking operation exceeds a proper level.

FIGS. 7 through 10 show another modified form of the regulating means according to the invention, wherein:

FIG. 7 is a side elevational view;

FIG. 8 is a sectional view taken along line VIII—VIII in FIG. 7;

FIG. 9 is a sectional view similar to FIG. 8, showing the state of the brake wire in which the amount play thereof during braking operation exceeds a proper level; and FIG. 10 is a sectional view taken along line X—X in FIG. 7.

DESCRIPTION OF THE PREFERRED EMBODIMENTS

Figure 1:
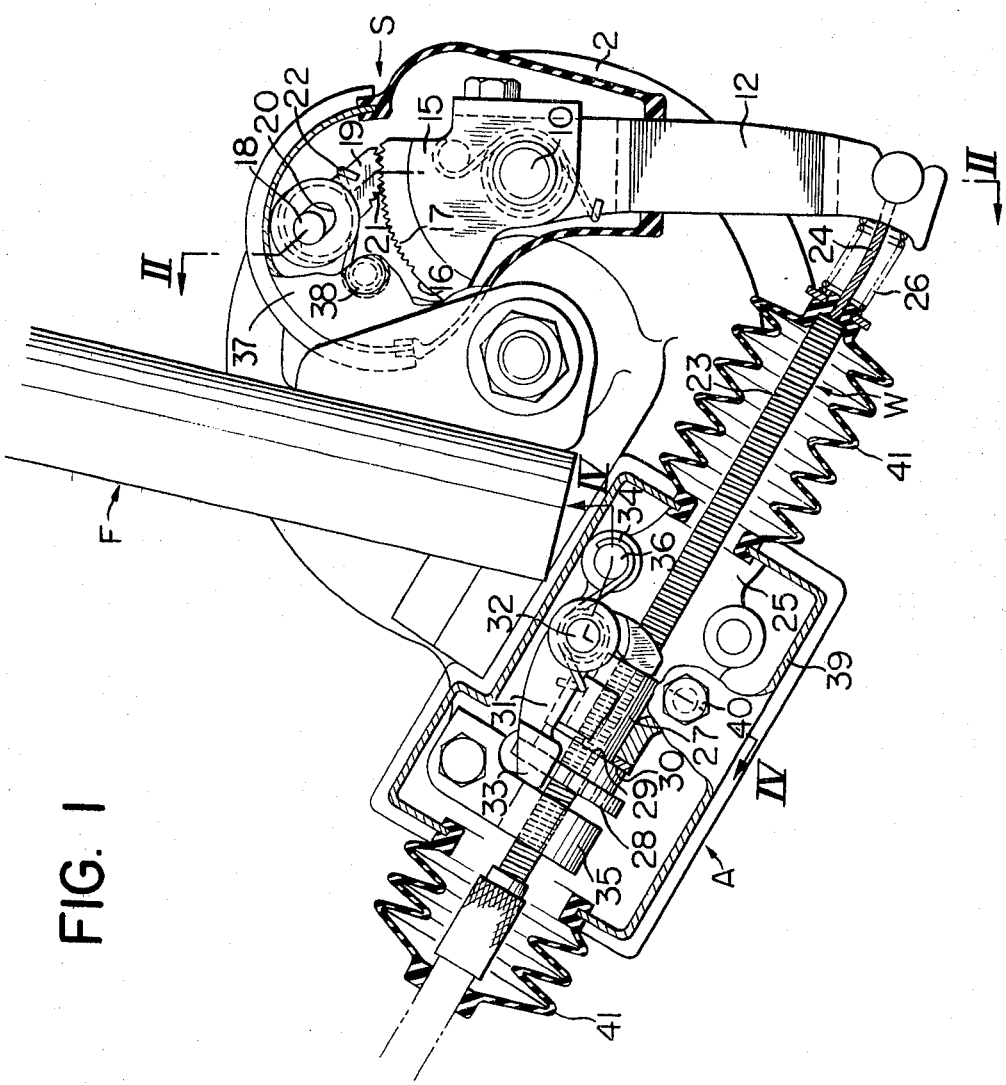
Figure 2:
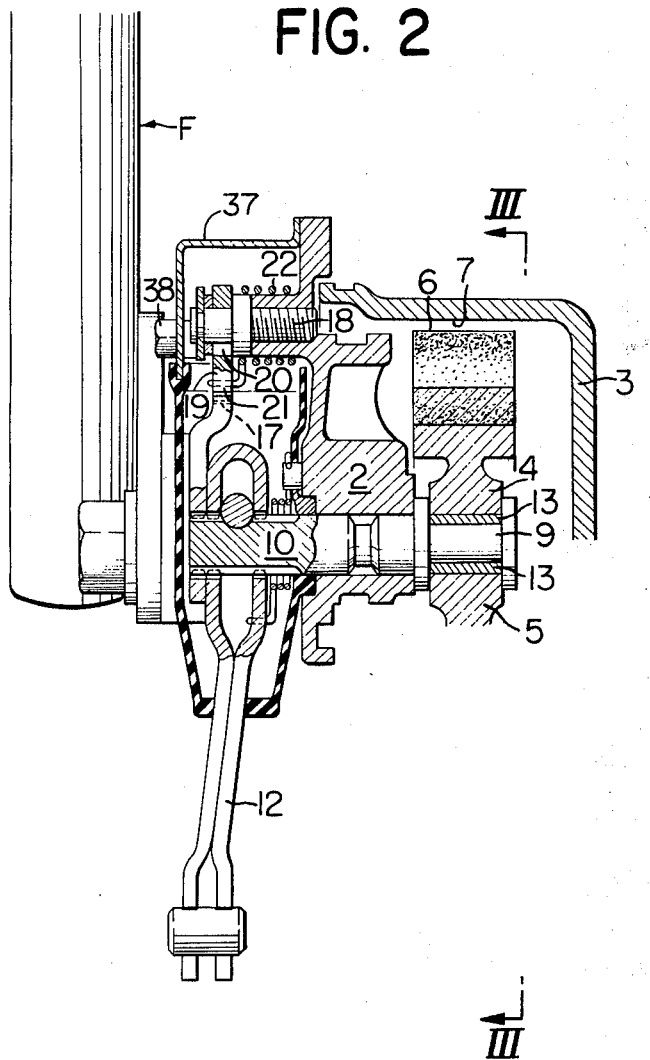
Figure 3:
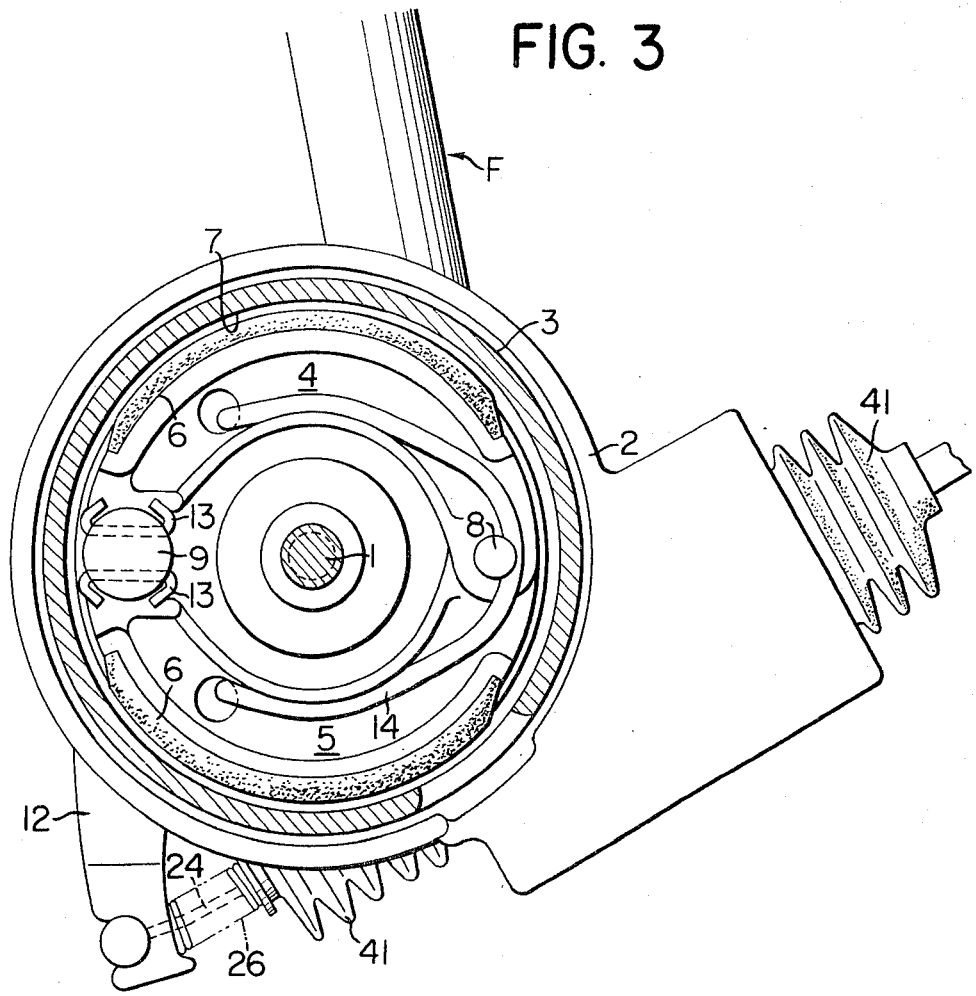
Figure 4:
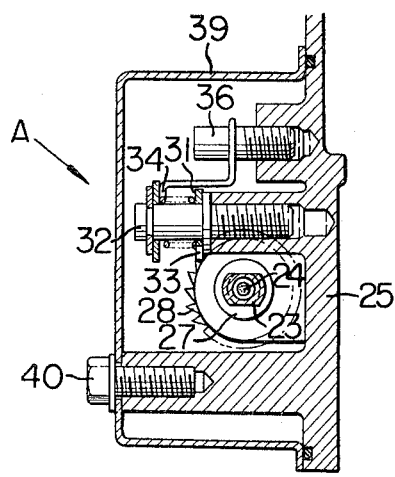

An embodiment of the present invention applied to a motorcycle will be described with reference to FIGS. 1 through 5.

At an end portion of an axle 1, a brake panel 2 is fastened to a frame F such that the brake panel 2 can be rotated relative to the axle 1. A brake drum 3 rotating with a wheel is mounted fixedly on the end portion of the axle 1. Arcuate, paired first and second brake shoes 4, 5 are provided in the brake drum 3, and shoe linings 6 are fixed on the respective arcuate outer peripheral surfaces of the brake shoes 4, 5. Each of the linings 6 is opposed to the inner circumferential surface of the brake drum 3, i.e. a brake surface 7. The paired first and second brake shoes 4, 5 are supported pivotally at their respective base ends via an anchor bolt 8 in such a manner that the brake shoes 4, 5 can be expanded and contracted with respect to each other. A brake cam 9 is interposed between the free ends of the first and second brake shoes 4, 5. A shaft portion 10 of the brake cam 9 is extended through the brake panel 2 to project outside thereof, and a brake lever 12 is mounted fixedly at a base end thereof on the projected portion of the shaft portion 10. Metal contact members 13 are attached to the free ends of the first and second brake shoes 4, 5, and a cam surface of the brake cam 9 is in contact with these metal contact members 13. A return spring 14 is supported on the anchor bolt 8, and engaged at the free ends thereof with intermediate portions of the brake shoes 4, 5. The brake shoes 4, 5 are thus urged by the resilient force of the return spring 14 in the direction in which the brake shoes 4, 5 are contracted with respect to each other. A brake wire W is connected to the free end of the brake lever 12. When the brake wire W is pulled, the brake lever 12 is pivoted clockwise in FIG. 1 so that the brake cam 9 is rotated to expand the first and second brake shoes 4, 5 thereby to force the shoe linings 6 against the brake surface 7 of the brake drum 3. The motorcycle can be braked in this manner.

A stopper mechanism S is provided between the brake panel 2 and brake lever 12. The stopper mechanism S is adapted to maintain constant the return angle of the lever 12 when the brake is released, and serves to display a limit of wear on the shoe linings 6.

The construction of the stopper mechanism S will now be decribed. A sector-shaped adjusting stopper 15 is fixedly mounted on the shaft portion 10 of the brake cam 9. The adjusting stopper 15 has an arcuate outer peripheral surface 16 the center of which is in alignment with the center of rotation of the brake cam 9, and is provided with teeth 17 on the arcuate surface 16. A support pin 18 is screwed to the brake panel 2, and a stopper arm 19 is mounted loosely at its elongated bore 20 on the support pin 18. The stopper arm 19 has teeth 21 on the free end thereof, which are engageable with the teeth 17 on the arcuate surface 16. A spring 22 is provided between the stopper arm 19 and brake panel 2. The resilient force of the spring 22 is applied to the stopper arm 19 to urge the same in such a manner that the stopper arm is pressed against the adjusting stopper 15 to place the teeth 17, 21 into engagement with one another.

When the brake wire W is pulled, the brake lever 12 is pivoted clockwise while allowing the stopper arm 19 to escape in the upward direction, to rotate the brake cam 9 in the same direction as the brake lever 12. Thus, the motorcycle can be braked as mentioned above. When the brake wire W is relieved of the pulling force, the brake lever 12 is pivoted counter-clockwise by the return spring 14 provided in the brake drum 3, so that the brake is released. When the stopper arm 19 is displaced in the upward direction as mentioned above, the support pin 18 abuts against the circumferential edge of the elongated bore 20, so that the counter-clockwise pivotal movement of the adjusting stopper 15 is stopped by the stopper arm 19. Accordingly, the return angle of the brake lever 12 is controlled to a constant value at all times irrespective of the angle of pivotal movement of the brake lever 12 during the brake applying operation. Therefore, when the shoe linings 6 are worn to cause an increase in the pivot stroke of the brake lever 12, the meshing position between the teeth 17 of the adjusting stopper 15 and the teeth 21 of the stopper arm 19 displaces from the initial position. As a result, the position, at which the brake lever 12 in a returning motion is stopped after the brake has been released, is changed gradually in the leftward direction in FIG. 1. This allows the condition of wear on the shoe linings 6 to be displayed externally.

As the wear on the shoe linings 6 progresses, the amount of play of the brake wire W is increased but such an increase in the amount of play of the brake wire W can be automatically corrected or regulated to be at a constant and suitable level by a regulating means A which is adapted to be actuated in accordance with a brake-applying operation or a brake-releasing operation. The regulating means A will now be described.

The brake wire W consists of an outer wire member 23 and an inner wire member 24 inserted through the outer wire member 23, the inner wire member 24 being connected to the free end of the brake lever 12. The outer wire member 23 passes through and is axially slidably supported by a stationary support member 23, which is formed integrally with the brake panel 2. A free end of the outer wire member 23 is joined to the free end of the brake lever 12 via a compression spring 26, by the resilient force of which the outer wire member 23 is urged in a direction away from the brake lever 12. An adjusting nut 27 is screwed on an intermediate portion of the outer wire member 23. The adjusting nut 27 is supported slidably and rotatably in the stationary support member 25, and a ratchet wheel 28 is formed on a larger diameter head portion of the adjusting nut 27. The adjusting nut 27 has a contact surface 29 at a stepped portion thereof, which is opposed to a receiving surface 30 formed on the stationary support member 25. The rightward movement of the adjusting nut 27 in FIG. 1 is restricted as the contact surface 29 thereof comes into engagement with the receiving surface 30. A stopper 35 formed integrally with the stationary support member 25 is provided to face an outer end surface of the adjusting nut 27, serving to prevent the rotation of the outer wire member relative to the stationary support member 25.

An adjusting lever 31 in the form of a bellcrank lever is rotatably supported at an intermediate portion thereof via a support pin 32 on that portion of the stationary support member 25 which is close to the adjusting nut 27. The adjusting lever 31 has a base end opposed to an inner end surface of the adjusting nut 27, and a pawl 33 formed at a free end portion of the adjusting lever 31 for engagement with the ratchet wheel 28 of the adjusting nut 27. A torsion spring 34 is connected between the adjusting lever 31 and a locking pin 36 secured in the stationary support member 25. The adjusting lever 31 is urged by the resilient force of the torsion spring 34 to rotate in a clockwise direction in FIG. 1 so that the base end of the adjusting lever 31 is pressed against the pawl 33 to be disengaged from the ratchet wheel 28.

Reference numeral 37 denotes a dust-proof cover for the stopper mechanism S, which cover 37 is fastened to the brake panel 2 with a bolt 38; numeral 39 denotes a cover for the regulating means A, which cover 39 is fastened to the brake panel 2 with a bolt 40; and numeral 41 denotes a bellows type cover for enclosing the outer wire member 23.

The operation of the above embodiment of the present invention will now be described. When the inner wire member 24 of the brake wire W is pulled for a brake application, the brake lever 12 is pivoted clockwise in FIG. 1, to rotate the brake cam 9 so that the first and second brake shoes 4,5 are displaced or expanded outwardly at their free ends contacting the brake cam 9 away from each other against the resilient force of the return spring 14. As a result, the shoe linings 6 on the brake shoes 4, 5 are pressed against the brake surface 7 of the brake drum 3 to apply the braking force to the wheel.

Figure 5:
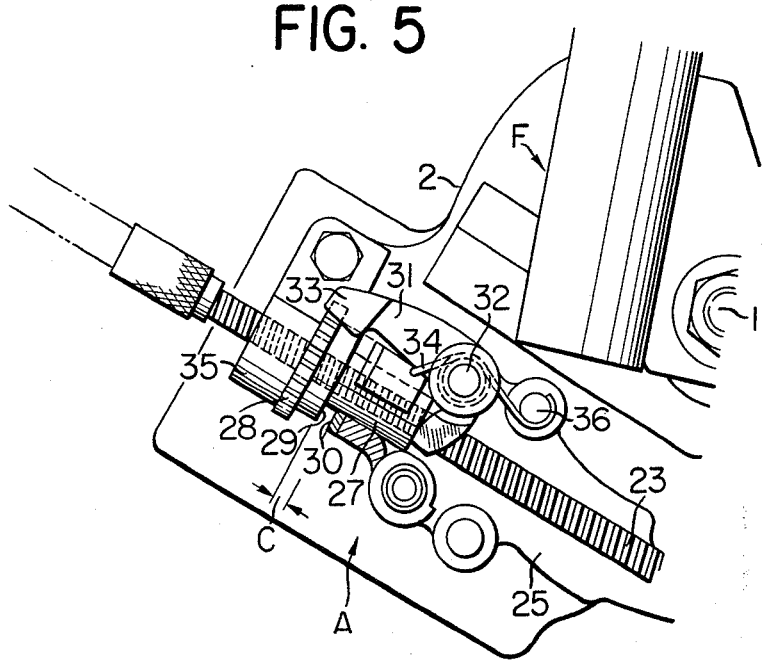

When the shoe linings 6 are worn gradually due to repeated braking operations to enlarge the clearance between the shoe linings 6 and brake surface 7, the pivot angle of the brake lever 12 for brake application is increased. On the other hand, the return angle of the brake lever 12 upon a brake releasing operation is maintained at a constant level by the stopper mechanism S as described previously. Accordingly, when the brake lever 12 is pivoted excessively during a brake applying operation, a position, in which the brake lever 12 is stopped after the brake has been released, is shifted leftward in FIG. 1 by a distance corresponding to the excessive amount of the pivotal movement thereof. This causes the connection point of the inner wire member 24 with the brake lever 12 also to be shifted leftward so that the position of the inner wire member 24 relative to the outer wire member 23 is axially displaced to produce axial play or ineffective stroke on the outer wire member 23. Accordingly, due to the resilient force of the compression spring 26 applied to the outer wire member 23, there is formed a clearance C between the contact surface 29 of the adjusting nut 27 and the receiving surface 30 of the stationary support member 25, as shown in FIG. 5. When the brake is then applied again, the adjusting nut 27 screwed over the outer wire member 23 is moved rightward in FIG. 5 by a braking reaction force occurring upon brake application until the contact surface 29 thereof has come into engagement with the receiving surface 30. As a result, the adjusting lever 31 is forced by the adjusting nut 27 to rotate in a counter-clockwise direction in FIGS. 1 and 5 against the resilient force of the torsion spring 34 so that the adjusting nut 27 is rotated by the pawl 33, provided at the free end of the adjusting lever 31, to cause the outer wire member 23 to be moved axially in the outward direction ( in the leftward direction in FIG. 1). Thus, the relative position between the inner wire member 24 and the outer wire member 23 is properly regulated to reduce the increased amount of play therebetween. When the braking force is released, the pawl 33 is disengaged from the ratchet wheel 28 due to the resilient force of the torsion spring 34.

The above operations are repeatedly carried out until the clearance C due to the wear on the shoe linings 6 or the expansion of the brake wire W is reduced to zero.

Figure 6:
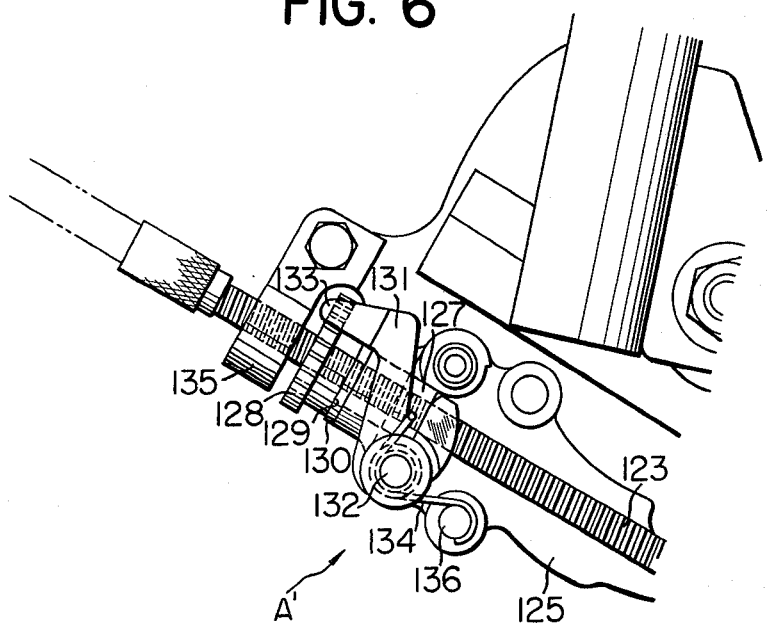
FIG. 6 is a side elevational view of a modified form of a regulating means according to the invention.
Figure 7:
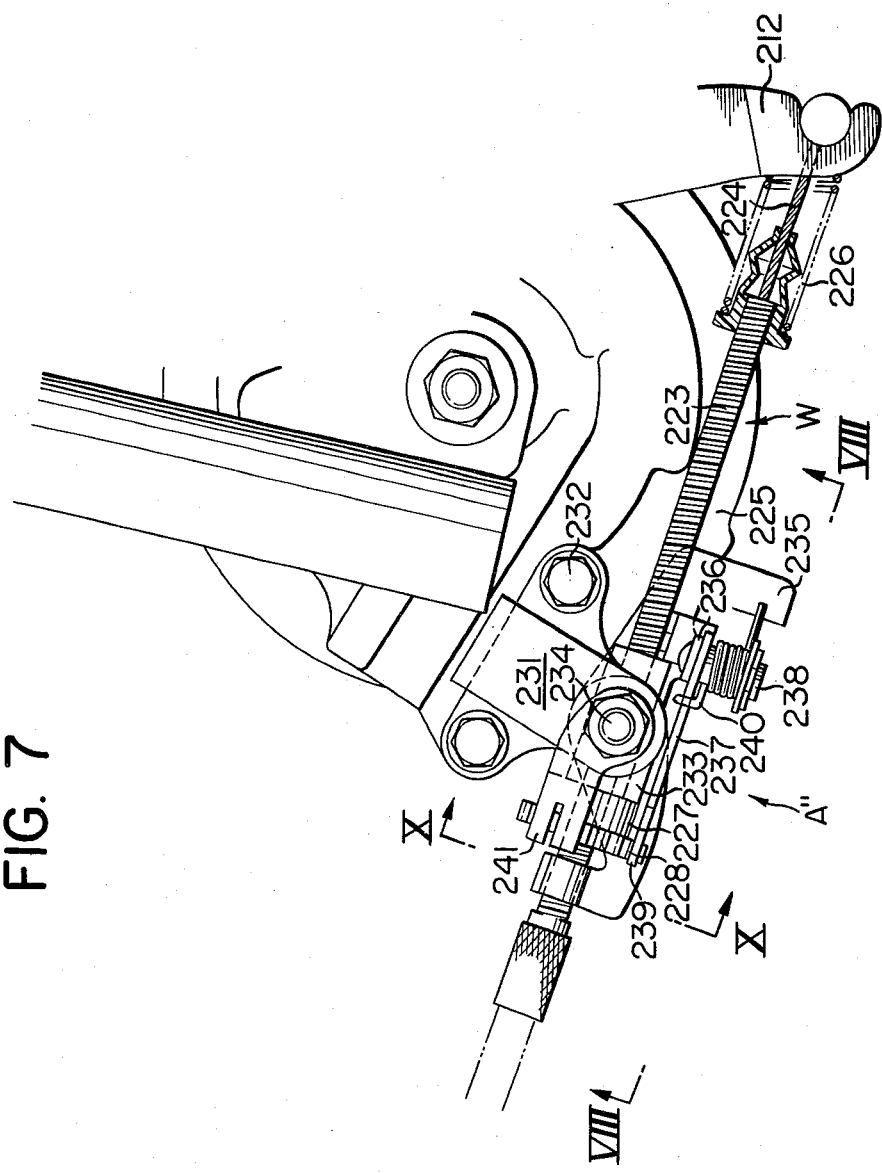
Figure 8:
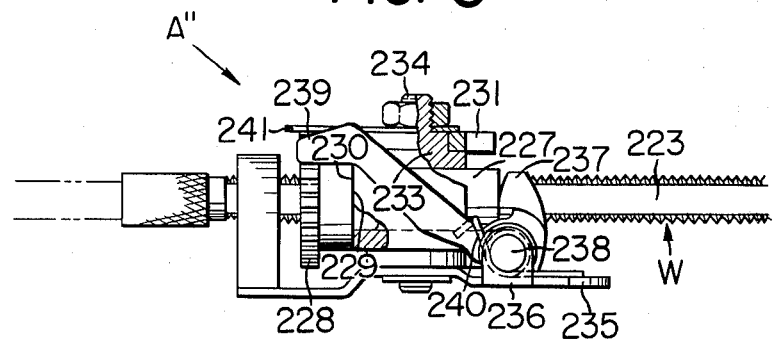

FIG. 6 shows a modified form of the regulator according to the present invention in which the regulation in play or ineffective stroke of the brake wire W is carried out in response to a brake releasing operation. In the regulating means A' of this modification, a V-shaped adjusting lever 131 is pivotally supported at an intermediate portion thereof at 132 on that portion of a stationary support member 125 which is lower than brake wire W. A torsion spring 134 is connected between the adjusting lever 131 and a locking pin 136. The adjusting lever 131 is urged by the torsion spring 134 to rotate counter-clockwise, i.e., in the direction in which a pawl 133 comes into engagement with a ratchet wheel 128. Accordingly, when the braking force is released to eliminate a braking reaction force applied to the brake wire W, the adjusting nut 127 is threadedly rotated to axially move in the rightward direction in FIG. 6 by the adjusting lever 131 under the action of torsion spring 134 to place a contact surface 129 of the adjusting nut 127 into abutting engagement with a receiving surface 130 formed on the stationary support member 125. Reference numeral 135 denotes a stopper formed integrally with the stationary support member 125.

FIGS. 7 through 10 show another modified form of the regulator according to the present invention in which a regulating means A" is constructed as follows.

Brake wire W connected to a free end of a brake lever 212 consists of an outer wire member 223 and an inner wire member 224 inserted through the outer wire member 223. The inner wire member 224 is joined to a free end of the brake lever 212. The outer wire member 223 is connected at one end thereof via a compression spring 226 to the free end of the brake lever 212. Due to the resilient force of the compression spring 226, the outer wire member 223 is urged in a direction away from the brake lever 212.

A channel-shaped holder 231 is fixed to the stationary support member 225 with bolt 232. A block type nut receiving member 233 is rotatably supported by the holder 231 so as to expedite the relative axial movement between the inner and outer wire members 223, 224 upon brake applying or releasing operations. An adjusting nut 227 is fitted in the nut receiving member 233 in an axially movable and rotatable manner. The adjusting nut 227 is threadedly fitted over a screw portion of the outer wire member 223, and a ratchet wheel 228 is formed at a larger diameter head portion of the adjusting nut 227. The screw portion of the outer wire member 223 is axially cut off at diametrically opposite side portions thereof.

The adjusting nut 227 is provided at a stepped portion thereof with a contact surface 229 which is opposed to a receiving surface 230 formed on the nut receiving member 233. The contact surface 229 is adapted to come into engagement with the receiving surface 230 for restricting the movement of the adjusting nut 227 in the rightward direction in FIG. 7. A setting plate 235 is attached at an intermediate portion thereof to one side of the nut receiving member 233. An L-shapped adjusting lever 237 is rotatably supported via a support pin 238 on an upright member 236 upstanding from the setting plate 235. A base end (right end in FIG. 7) of the adjusting lever 237 is opposed to an inner end surface of the adjusting nut 227. A pawl 239 is formed at a free end (left end in FIG. 7) of the adjusting lever 237 for engagement with the ratchet wheel 228 formed on the adjusting nut 227. A torsion spring 240 is connected between the setting plate 235 and the adjusting lever 237 for urging the latter to rotate in the counter-clockwise direction in FIG. 9 or in the direction to engage the ratchet wheel 228.

Figure 10:
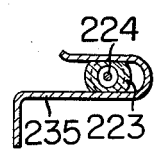

A stopper member 241 is attached to the nut receiving member 233 and resiliently engaged with the ratchet wheel 228 formed on the adjusting nut 227 so as to prevent the adjusting nut 227 from being inadvertently turned in accordance with pivotal movements of the nut receiving member 233. The setting plate 235 is bent at a free end portion thereof in the shape of the letter "U", as shown in FIG. 10, to clamp the outer wire member 223 for preventing rotation of the brake wire W.

Figure 9:
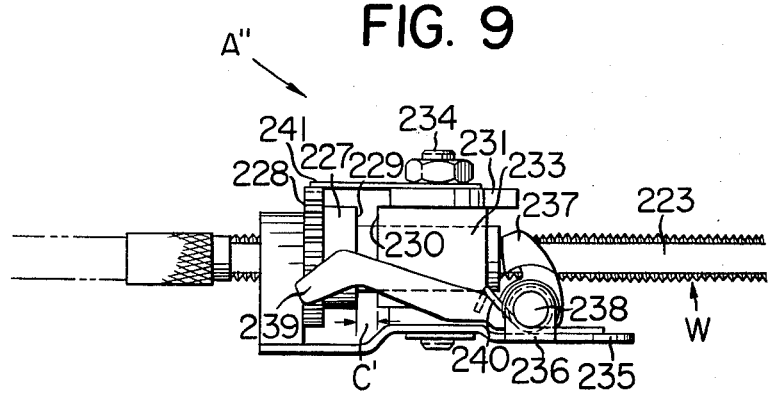

When the relative axial positions of the inner wire member 224 and the outer wire member 223 are changed during a braking operation to form excessive play on the outer wire member 223, a clearance C' is produced, as shown in FIG. 9, between the contact surface 229 of the adjusting nut 227 and the receiving surface 230 of the nut receiving member 233 due to the resilient force of the compression spring 226. In this state, when the inner wire member 224 is pulled for brake application, the adjusting nut 227 threaded over the outer wire member 223 is moved to the right in FIG. 9 due to the braking reaction force until the contact surface 229 of the adjusting nut 227 has come into engagement with the receiving surface 230. Consequently, the adjusting lever 237 is forced by the adjusting nut 227 to rotate in a clockwise direction in FIG. 9 against the resilient force of the torsion spring 240 to place the pawl 239 formed on the free end of the adjusting lever 237 out of engagement with the adjusting nut 227. When the braking force on the brake wire W is released, the adjusting lever 237 is rotated counter-clockwise in FIG. 9 due to the resilient force of the torsion spring 240 so that the pawl 239 on the free end of the adjusting lever 237 is moved into engagement with the ratchet wheel 228 to turn and move the same in the rightward direction in FIG. 9. As a result, the outer wire member 223 is moved in the axially outward direction or in the leftward direction to properly regulate the relative positions of the inner wire member 224 and the outer wire member 223 for taking up the excessive play therebetween.

The above-described operations are repeatedly carried out as long as there is a clearance C' due to the wear on the shoe linings or expansion of the brake wire W.

Whenever a braking operation is carried out, as previously described, by drawing or releasing the brake wire W, the brake lever 212 is pivoted forwardly and rearwardly. In this case, the adjusting nut 227 threaded over the outer wire member 223 is rotated along with the nut receiving member 233 around the shaft portion 234 and the adjusting nut 227 is moved relative to the nut receiving member 233 so that the adjusting nut 227 is turned or axially moved with a little resistance to allow the easy and smooth regulation of the brake wire W without twisting.

As described in the foregoing, according to the present invention, when the amount of play of the brake wire during brake applying operation exceeds a predetermined level due to the wear on the shoe linings or the expansion of the brake wire, a position where the brake lever is to be stopped after release of the brake can be automatically shifted by a distance corresponding to the excessive amount of play of the brake wire, and an effective operational stroke of the brake wire can be automatically shortened by an amount corresponding to the mentioned excessive amount of play thereof. This allows a play or ineffective stroke of the brake wire to be always automatically reduced to a proper level without conducting a troublesome, manual wire-regulating operation as required in a conventional drum brake of this kind. Thus, a desired braking effect can be always obtained to enable a rider on a motorcycle to feel a constant braking effect.

The present invention also enables visual observation from the outside of the condition of wear of the shoe linings through the returning position of the brake lever upon the brake releasing operation.

While a few presently preferred embodiments of the invention has been shown and described herein, it is evident to those skilled in the art that various changes and modifications of the invention may be made therein without departing from the spirit and scope of the invention as defined in the appended claims.

What is claimed is:

1. An automatic regulator for an internally expanding drum brake comprising in combination: a brake drum rotatable with a rotary shaft and having a brake surface; a stationary brake panel; a pair of brake shoes housed in said brake drum and mounted on said stationary brake panel for outwardly expanding movement in a brake applying operation and inward return movement in a brake releasing operation; a brake cam rotatably interposed between opposed free ends of said first and second brake shoes and being rotatable to outwardly expand said first and second brake shoes toward said brake surface of said brake drum for frictional engagement in said braking operation; a brake lever secured to said brake cam; a stationary support member; a brake wire means connected to said brake lever, said brake wire means comprising an externally threaded outer wire member supported by said stationary support member for axial movement relative thereto, and an inner wire member inserted through said outer wire member and connected to said brake lever; a return spring for urging said brake shoes in a contracting direction; stopper means for controlling a return angle of said brake lever to be constant upon a brake releasing operation; and a regulating means for automatically regulating an amount of play of said brake wire to be constant in response to one of said operations, said regulating means comprising a biasing means for biasing said outer wire member in a direction away from said brake lever, an adjusting nut movably supported on said stationary support member and threaded on said outer wire member, and a nut-turning means on said stationary support member for turning said adjusting nut relative to said outer wire member in response to said one brake operation to axially displace said outer wire member relative to said inner wire member for adjustment of the relative position between said outer and inner wire members when the brake is not operated.

2. An automatic regulator for an internally expanding drum brake according to claim 1, wherein said nut-turning means comprises a ratchet wheel integrally formed with said adjusting nut; an adjusting lever pivotally mounted on said stationary support member, said adjusting lever having one end with a pawl member engageable with said ratchet wheel and being opposed at the other end thereof to an abutment surface of said adjusting nut; and a spring member for urging said adjusting lever to pivot in a direction to bring said other end of said adjusting lever into abutting engagement with said abutment surface of said adjusting nut and to disengage said pawl member at said one end of said adjusting lever from said ratchet wheel, said adjusting lever being rotated about its pivot point against the action of said spring member in response to movement of said outer wire member relative to said stationary support member caused by a reaction force generated upon brake applying operation to bring said pawl member into meshing engagement with said ratchet wheel thereby to turn said adjusting nut relative to said outer wire member.

3. An automatic regulator for an internally expanding drum brake according to claim 1, wherein said nut-turning means comprises a ratchet wheel integrally formed with said adjusting nut; an adjusting lever pivotally mounted on said stationary support member, said adjusting lever having one end with a pawl member engageable with said ratchet wheel and being opposed at the other end thereof to an abutment surface of said adjusting nut; and a spring member for urging said adjusting lever to pivot in a direction to bring said other end of said adjusting lever into abutting engagement with said abutment surface of said adjusting nut and said pawl member into meshing engagement with said ratchet wheel, said adjusting lever being rotated about its pivot point under the action of said spring merber in response to the movement of said outer wire member relative to said stationary support member upon a brake releasing operation.

4. An automatic regulator for an internally expanding drum brake according to claim 1, comprising a nut receiving member secured to said stationary support member for supporting said adjusting nut for relative sliding movement.

5. An automatic regulator for an intervally expanding drum brake according to claim 1, comprising a nut receiving member pivotally mounted on said stationary support member for supporting said adjusting nut for relative sliding movement.

6. An automatic regulator for an internally expanding drum brake according to claim 1, comprising a stopper member secured to said stationary support member for limiting the maximum displacement between said outer and inner wire members and for preventing rotation of said outer wire member relative to said stationary support member.

7. An automatic regulator for an internally expanding drum brake according to claim 1 comprising a cam shaft for said cam connecting said brake lever and said brake cam, said stopper means comprising an adjusting stopper secured to said cam shaft, said adjusting stopper having a toothed arcuate peripheral surface; a stopper arm, a pin and slot connection pivotally mounting said stopper arm on said brake panel, said stopper arm having a free end with a toothed portion thereon, and means urging said stopper arm into meshing engagement at its toothed portion with said toothed arcuate surface whereby the return stroke of said brake lever upon a brake releasing operation is always adjusted to be constant by the action of said pin and slot connection.

* * * * *